Patented June 24, 1930

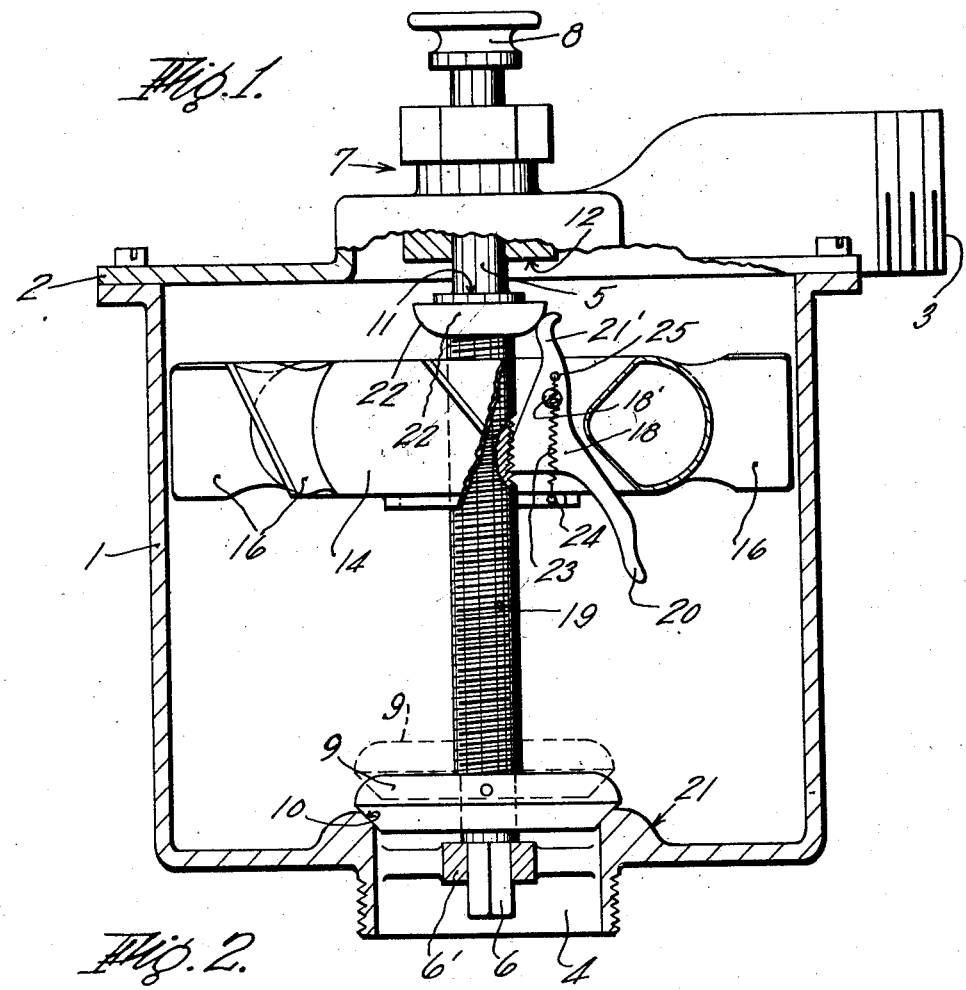
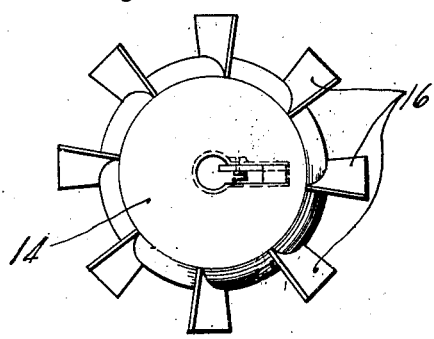

1,767,561

UNITED STATES PATENT OFFICE

WILLIAM H. STADDEN, OF SPRINGFIELD, MASSACHUSETTS

FLUSH VALVE

Application filed April 6, 1928. Serial No. 268,014.

This invention relates to improvements in flush valves and is directed more particularly to flush valves of the automatic type.

The principal object of the invention is the provision of a valve which is simple in construction so as to be economical to manufacture and one which is efficient in its operation.

According to one novel feature of the invention, I provide a valve of the class described wherein the flow of water through the valve is utilized to close the same after it has been manually opened to permit water to flow therepast. This is accomplished according to my invention by providing a relatively movable valve and seat which are closed by a buoyant member or float that is driven by the water flow against its buoyancy when the valve is open.

The novel features of the invention are adapted for broad application but for the purpose of disclosure are illustrated in the form at present preferred by means of the accompanying drawings, in which—

Fig. 1 is a sectional elevational view through a valve which has incorporated therein the novel combination and arrangement of parts constituting the important features of the invention; and Fig. 2 is a small scale plan view of the valve actuation propeller float of my improved valve.

Referring to the drawings in detail: 1 represents a body and 2 a cap of the valve casing, which are secured together in the usual manner by some suitable means such as coupling bolts, as shown. The cap 2 is provided with an inlet port 3 while the body is provided with an outlet port 4, which inlet and outlet may be provided with internal or external screw threads as shown in the latter form for connecting the valve to a system of water piping so as to control the flow of water or other fluid therein. A spindle 5 having its lower end 6 non-rotatable in, but slidable in a guide 6' disposed in the outlet 4 extends upwardly through the body and is slidable at its upper end in a stuffing box of usual form, indicated by 7, associated with the cap 2.

The spindle is guided to reciprocate up and down in the stuffing box and is provided with an operating knob 8 on the upper end thereof. A valve disc 9 carried by the spindle 5 is arranged when closed to seat on a valve seat 10 of the body in the manner shown and is moved from the seat by the spindle as it is manually elevated by grasping the handle 8. A shoulder 11 of the spindle is provided for abutting an end 12 of a guide carried by the cap so that the upward movement of the spindle may be limited.

In operation when it is desired to open the valve to allow water to flow therepast, the spindle is pulled upwardly to move the valve disc off the seat to the dotted line position shown so as to permit water to pass freely through the valve. The parts so far described of course will preferably be so arranged that the valve disc will remain open and not be acted upon and closed by the water as it flows thereby. This may be readily accomplished if necessary by providing some suitable means in connection with the spindle guideway for frictionally engaging or otherwise holding the spindle against longitudinal movement. In other words, the valve will preferably remain in its open raised position to allow water to flow through the system until it is automatically closed by the mechanism now to be described.

A hollow float 14 concentrically disposed about the spindle is provided which is preferably of such a nature that its buoyancy will cause it to assume the upper position shown. This float has radially disposed propeller blades 16. These blades are so tipped or inclined that as water is allowed to flow through the valve from the inlet to the outlet the float receives by water impingement a depressing and a rotary impulse. The blades are made of bendable metal so that they may be readily adjusted to the propelling force of the water as desired.

A threaded nut portion or segment 18 is pivoted at 18' in the float so as to be movable into or out of engagement with screw threads 19 of the spindle 5. When in engagement with the threads as shown, the float will in its rotation run down or traverse the threads until the lower side thereof abuts the upper side of the valve disc 9.

The inclination of the blades 16 is preferably such that the float will be rotated at considerable speed by water flowing through the valve and the pitch of the screw is preferably such that the float will in its rotation traverse the screw at such speed as to bring up against the disc within a desired time and with sufficient force to move the disc towards its seat for closing up the valve.

As the float brings up against the disc, its rotation is thereby arrested so that its upper surface and the blades thereof offer a materially increased resistance to the flow of water passing through the valve resulting in a strong final impact on the float to move it as well as the disc downwardly so that said valve disc is seated on its seat and thereby automatically closes the valve and shuts off the flow of water. To disconnect the float from the screw threads, the nut portion 18 is provided with an extension arm 20 which is arranged to bring up against a cam surface 21 of the body at or just before the time when the valve disc is seated so that the nut portion is swung by the cam 21 out of engagement with the threads of the spindle.

With the nut moved out of engagement with the screw, the float is then free to rise by reason of its buoyancy upwardly from the valve disc and along the spindle to its upper position. An upwardly extending arm 21' of the nut is arranged to bring up against a cam surface 22' of a cam collar 22 of the spindle as the float reaches its upper position. By means of the cam the nut portion is again swung into engagement with the threads of the spindle as shown and will in its rotative movement traverse the screw for closing the valve.

A coil spring 23 for holding the nut portion in its engaged or disengaged position is provided which has its opposite ends connected to a pin 24 of the float and a similar pin 25 of the nut portion. The pins 24 and 25 are preferably disposed with reference to the pivot 18' of the nut portion so that the upper end of the spring may move back and forth across the pivot with a toggle action so as to swing the portion 18 towards and away from the spindle. That is, while the cams 21 and 22 effect the initial movement of the portion 18 towards and away from the spindle the spring and pins are arranged to function to pull such portion to the limit of its movement in one direction and the other, as well as hold it in its disengaged and engaged positions while the float is rising upwardly of the screw and traversing the threads thereof.

From the description it appears that my flush valve construction is based on a new principle of float operation, which principle may be embodied in various structures more or less differing from the one here described as an example.

My float operates entirely differently from conventional float types in which the valve is actuated by the gravity and buoyancy of the float while my float utilizes for this purpose the kinetic or impact energy acquired while descending against the action of its buoyancy under the influence of water impingement. In my float the buoyancy only serves to return the float after the valve has been closed to its upper stop position and prepare it for renewed closing function. My float is a submerged type in contradistinction to the usual floating types.

Since only the valve-axial or vertical component of the impact energy is of import for the closing of the valve, I might also design my float on a straight-line travel of its points instead of a helical travel as shown in the example. It is obvious that among the reasons for preferring a helical travel by means of thread engagement also counts the advantage of timing thereby the float descent and yet providing sufficient final impact energy by raising the flow resistance during the closing action proper.

By varying the length of travel of the valve actuating means, the pitch of the threads, the angle of vanes 16, the area of float 14, and the distance between stops 11 and 12 or some of them I can adjust the valve to all sorts of conditions. This is important because in flush valve use, for example, it is desired to deliver an approximately measured amount of water at each operation. If the water pressure is high, the operation of the valve should be faster than when the water pressure is lower. The same valve may have its speed of closing made faster or slower by merely bending the vanes 16 at appropriate angles. The valve thus has a capacity for simple adjustment which enables me to make one type of valve for a wide range of operating conditions.

I claim:

1. The combination of a flush valve having a valve seat and a valve disc movable towards and away therefrom with means for operating said disc comprising a guide and a float rotatable thereon by a flow of water through said valve, means associated with said guide and float whereby in its rotation it is caused to traverse said guide and abut said disc for a closing movement thereof.

2. The combination of a flush valve having a valve seat and a valve disc movable towards and away therefrom with means for operating said disc comprising a threaded guide, a float rotatable thereon by a flow of water through said valve, a nut device in said float movable into and out of engagement with said threaded guide and means at opposite ends of said guide for actuating said device so arranged that the float will traverse said guide in its rotation thereabout for abutting and closing said disc and return to an operable position.

3. The combination of a flush valve having a valve seat and a valve disc movable towards and away therefrom with means for operating said disc comprising a threaded guide extending above said disc, a float rotatable and reciprocable thereon, a nut device movable in said float into and out of engagement with said guide, means at opposite ends of said guide for moving said nut device into and out of engagement with said guide, whereby the float will be caused to traverse said guide as it is rotated by the flow of water through the valve so as to abut and close said disc and thereafter return to operating position.

4. A valve apparatus comprising a casing with an inlet and an outlet at opposite ends, a valve to open and close the outlet, valve operating mechanism between the inlet and said valve comprising a rotatable float having vanes to apply the power of the water flowing through the casing when the valve is open to rotate the float, a threaded guide on which the float is mounted to descend during its rotation until it strikes the valve to close it, and automatically releasable means to release the connection between guide and float when the valve is closed, said means being operable to again connect the guide and float when the latter rises to the top of the casing after the valve is closed.

5. A valve apparatus comprising a casing with inlet at the top and outlet at the bottom, a valve for said outlet, a float in the casing having hydraulically operable means associated therewith to lower the float against its buoyancy by the rush of water towards the open valve to close said valve by float impact in timed relation to the flow of water.

6. A valve apparatus comprising a casing with an inlet at the top and an outlet at the bottom, a valve for the outlet, a water wheel motor to close said valve, a float to normally hold said motor at the top of the casing, a threaded guide arranged vertically of the casing, a clutch to fasten the motor on the guide for lowering the motor and the float when the valve is open by rotation of the motor relative to the guide and automatic means to operate said clutch as the motor reaches its two extreme positions on said guide.

7. A valve apparatus comprising a casing having an inlet at the top and outlet at the bottom, a valve for the outlet arranged to be pushed into closed position, a water wheel in the casing arranged to turn in proportion to the flow of liquid therethrough, a threaded guide on which the water wheel may turn to push the valve closed in timed relation to said liquid flow, automatic means to connect and disconnect said water wheel to said guide, and a float associated with said water wheel to raise the latter after the valve is closed and the water wheel is disconnected from the guide.

8. A valve apparatus comprising a casing having an inlet at the top and an outlet at the bottom, a threaded reciprocable rod centrally of the casing with the movable valve element at its lower end for seating it in said outlet, an extension of the rod from the top of the casing, a handle to raise the rod and open the valve, a float within the casing surrounding said rod, a threaded clutch on the float arranged to connect and disconnect the latter to said rod, means to connect the clutch when the float is at the top of the casing and disconnect it when the float is at the bottom of the casing, said float having vanes for the water to turn the float downwardly on the rod to push said valve closed.

9. In combination with a valve for making and breaking a fluid flow in a pressure energized conduit means for opening said valve and holding it in open position and means for automatically closing it comprising a submerged buoyant body axially, vertically movable in said conduit between an upper abutment and a lower valve-coupled abutment, said buoyant body while the valve is open being driven through the rush of fluid from its upper abutment to its lower abutment for closing the valve by impact on the lower abutment and when the valve is closed being returned by buoyancy to its upper abutment.

10. In combination with a disk-valve with threaded valve stem for making and breaking a fluid flow in a pressure energized conduit, means associated with the valve stem for opening said valve and holding it in open position, and means for automatically and timedly closing it comprising a submerged buoyant propeller axially, vertically movable in said conduit in concentric relation with the valve stem between an upper abutment and the valve disk as a lower abutment, said buoyant propeller carrying switch means permitting of an automatic snap action from said abutments for switching the propeller movements therebetween from free ascent to thread-engaged helical descent on the valve stem and vice versa, said buoyant propeller while the valve is open being driven through the rush of fluid from its upper abutment onto the valve disk for closing the valve by impact and when the valve is closed being returned by buoyancy to its upper abutment for renewed closing function.

In testimony whereof I have affixed my signature.

WILLIAM H. STADDEN.